United States Patent [19]
Redlinger et al.

[11] Patent Number: 6,120,406
[45] Date of Patent: Sep. 19, 2000

[54] AUTOMATIC TRANSMISSION WITH ENERGY SAVING LOGIC AND FAILSAFE OPERATIONS

[75] Inventors: Charles J. Redlinger, Macomb; Gerald L. Holbrook, Rochester Hills, both of Mich.

[73] Assignee: DaimlerChrysler Corporation, Auburn Hills, Mich.

[21] Appl. No.: 09/283,912

[22] Filed: Apr. 1, 1999

[51] Int. Cl.[7] .................................................. F16H 61/12
[52] U.S. Cl. ........................................ 475/132; 475/133
[58] Field of Search ................................... 475/132, 133, 475/906

[56] References Cited

U.S. PATENT DOCUMENTS

| | | |
|---|---|---|
| 4,527,448 | 7/1985 | Person et al. . |
| 4,875,391 | 10/1989 | Leising et al. . |
| 5,016,176 | 5/1991 | Holbrook et al. . |
| 5,319,963 | 6/1994 | Benford . |
| 5,456,647 | 10/1995 | Holbrook . |
| 5,468,198 | 11/1995 | Holbrook et al. . |
| 5,533,945 | 7/1996 | Martin et al. . |
| 5,536,220 | 7/1996 | Martin et al. . |
| 5,588,929 | 12/1996 | Benford . |
| 5,801,621 | 9/1998 | Issa et al. . |
| 5,919,108 | 7/1999 | Takagi ..................................... 475/127 |

OTHER PUBLICATIONS

U.S. application No. 09/282,383, Collins et al., filed Mar. 31, 1999.
U.S. application No. 09/282,991, Martin et al., filed Mar. 31, 1999.
U.S. application No. 09/282,676, Martin et al., filed Mar. 31, 1999.
U.S. application No. 09/282,988, Martin et al., filed Mar. 31, 1999.
U.S. application No. 09/282,368, Collins et al., filed Mar. 31, 1999.
U.S. application No. 09/282,987, Nogle et al., filed Mar. 31, 1999.
U.S. application No. 09/282,918, Collins et al., filed Mar. 31, 1999.
U.S. application No. 09/283,911, Holbrook et al., filed Apr. 1, 1999.
U.S. application No. 09/282,670, Redinger et al., filed Mar. 31, 1999.
U.S. application No. 09/283.927, Holbrook et al., filed Apr. 1, 1999.
U.S. application No. 09/282,671, Nassar et al., filed Mar. 31, 1999.
U.S. application No. 09/283,073, Nogle et al., filed Mar. 31, 1999.
U.S. application No. 09/283,912, Redinger et al., filed Apr. 1, 1999.
U.S. application No. 09/282,375, Dourra et al., filed Mar. 31, 1999.
U.S. application No. 09/281,861, Martin et al., filed Mar. 31, 1999.
U.S. application No. 09/282,234, Martin et al., filed Mar. 31, 1999.
U.S. application No. 09/282,376, Nogle et al., filed Mar. 31, 1999.
U.S. application No. 09/282,675, Martin et al., filed Mar. 31, 1999.
U.S. application No. 09/282,791, Redinger et al., filed Mar. 31, 1999.
U.S. application No. 09/282,990, Botosan et al., filed Mar. 31, 1999.

(List continued on next page.)

*Primary Examiner*—Dirk Wright
*Attorney, Agent, or Firm*—Marc Lorelli

[57] ABSTRACT

An automatic transmission is provided with failsafe operation via a unique manual valve and multi-select solenoid arrangement. The transmission also provides for an energy saving logic operation mode.

4 Claims, 15 Drawing Sheets

OTHER PUBLICATIONS

U.S. application No. 09/282,669, Botosan et al., filed Apr. 1, 1999.

U.S. application No. 09/283,899, Holbrook et al., filed Apr. 1, 1999.

U.S. application No. 09/283,910, Holbrook et al., filed Apr. 1, 1999.

U.S. application No. 09/283,454, Holbrook et al., filed Apr. 1, 1999.

U.S. application No. 09/283,567, Danielson et al., filed Mar. 31, 1999.

U.S. application No. 09/283,885, Toussagnon et al., filed Apr. 1, 1999.

U.S. application No. 09/295,713, Nassar et al., filed Apr. 21, 1999.

U.S. application No. 09.295,713, Nassar et al., filed Apr. 21, 1999.

U.S. application No. 09/196,022, Nassar et al., filed Apr. 21, 1999.

U.S. application No. 09/251,258, Botosan et al., filed Feb. 16, 1999.

U.S. application No. 09/210,977, Correa et al., filed Dec. 14, 1998.

U.S. application No. 09/168,836, Dourra et al., filed Oct. 08, 1998.

U.S. application No. 09/277,444, Dourra et al., filed Mar. 26, 1999.

U.S. application No. 09/273,670, Black et al., filed Mar. 23, 1999.

FIG 2A

| -RWD 4-SPEED ELECTRONIC TRANSMISSION | MANUAL VALVE POSITION | GEAR | TORQUE RATIO | CLUTCHES APPLIED |
|---|---|---|---|---|
| UD-UNDERDRIVE CLUTCH<br>OD-OVERDRIVE CLUTCH<br>R -REVERSE CLUTCH<br>4C-4TH. CLUTCH<br>2C-2ND. CLUTCH<br>LR-LOW-REVERSE CLUTCH<br>FW-FREE WHEEL<br>CC-CONVERTER CLUTCH | | REV.<br>PARK. NEU.<br>1ST.<br>2ND.<br>2'<br>DIRECT<br>4TH.<br>4' | 3.00<br><br>3.00<br>1.67<br>1.50<br>1.00<br>0.75<br>0.67 | RC.LR<br><br>LR<br>UD.FW.(LR)<br>UD.2C<br>UD.4C<br>UD.OD<br>OD.4C<br>OD.2C |

C=CARRIER ASSEMBLY  A=ANNULUS GEAR  S=SUN GEAR  CC=CONVERTER CLUTCH  FW=FREE WHEEL CLUTCH

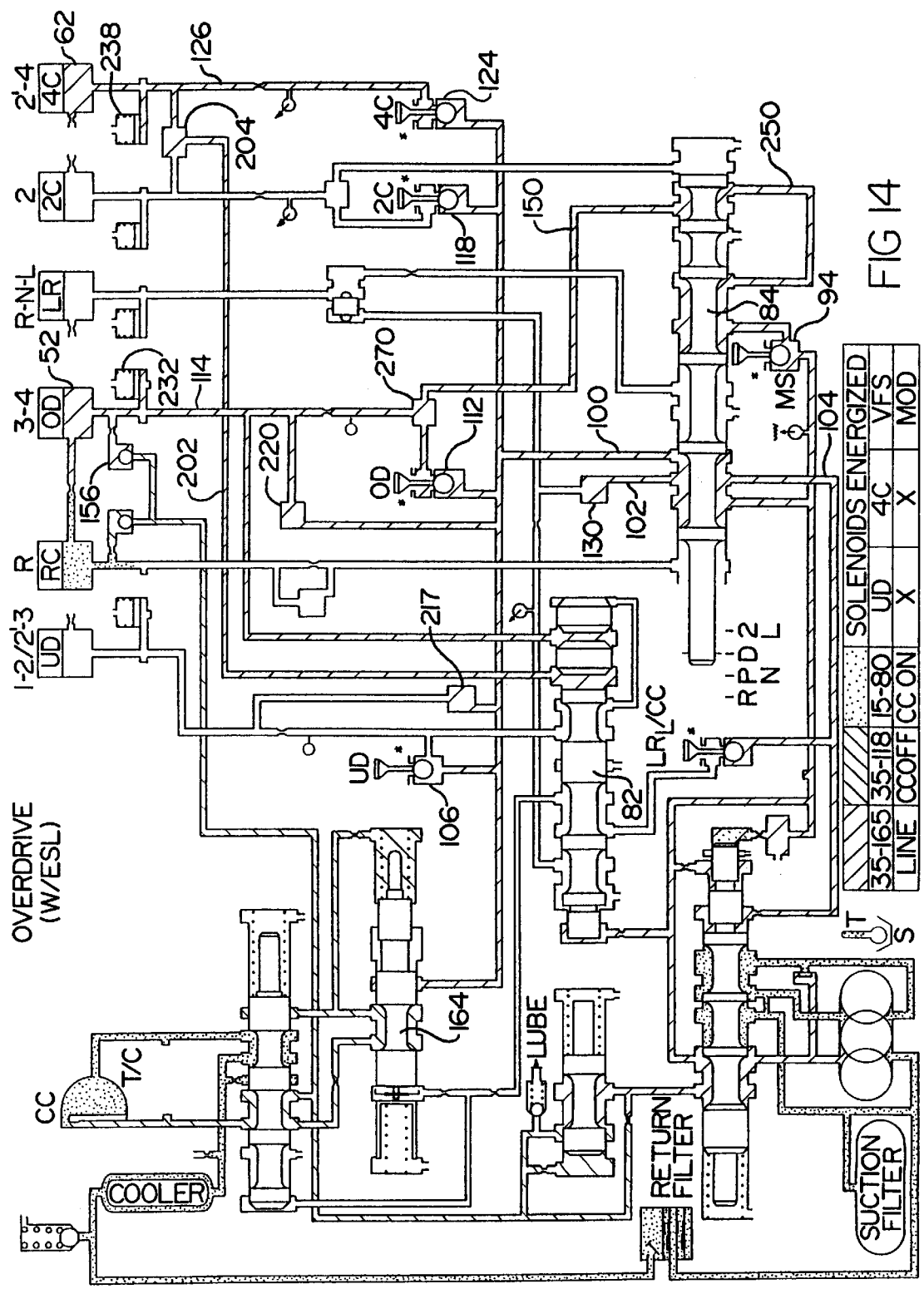

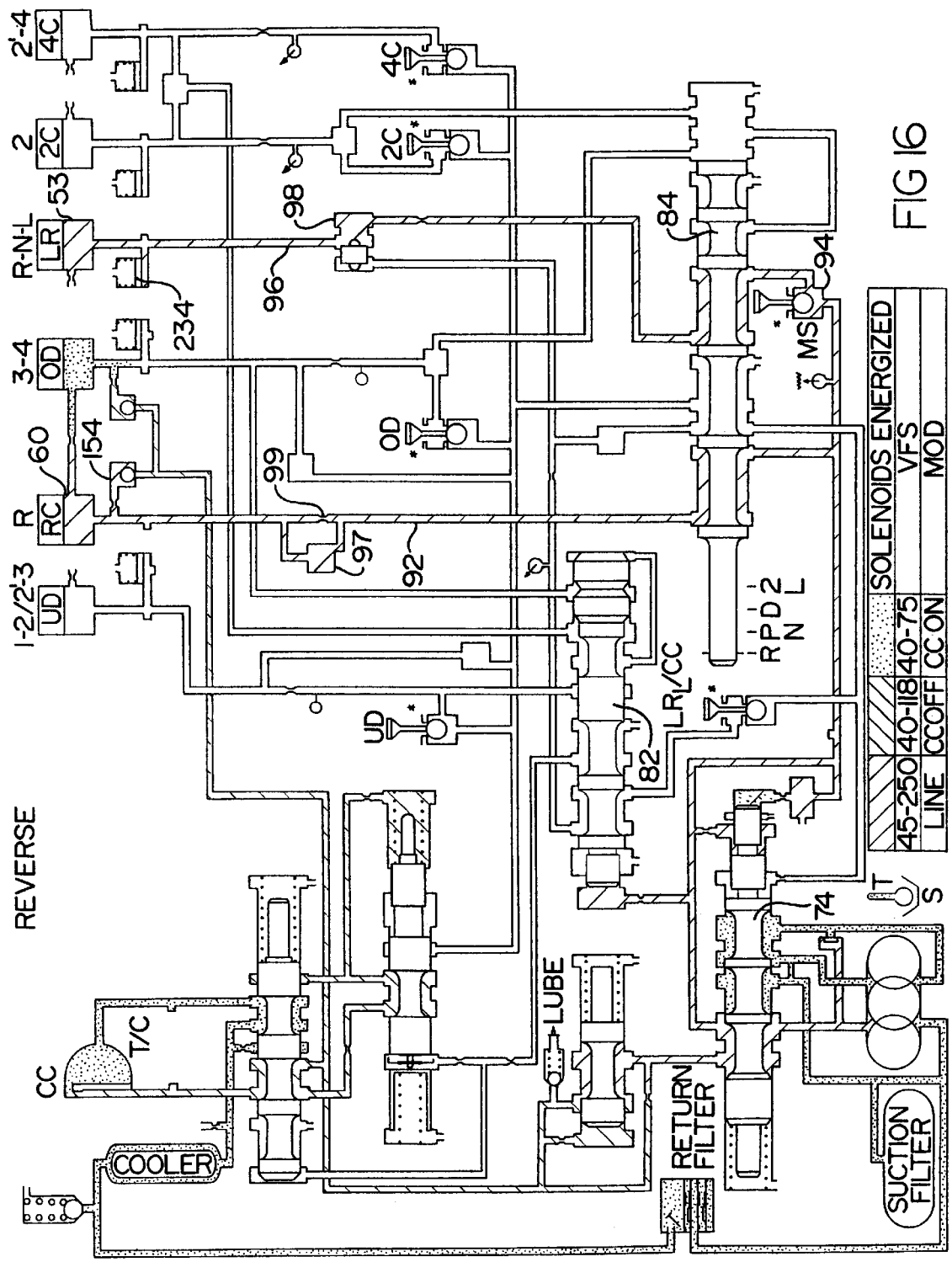

AUTOMATIC TRANSMISSION WITH ENERGY SAVING LOGIC AND FAILSAFE OPERATIONS

BACKGROUND OF THE INVENTION

1. Field of the Invention

The present invention relates generally to automatic transmissions, and more particularly to a unique manual valve and shift solenoid arrangement which provides for failsafe operation when a malfunction of the electronic controller or electronics occur. The present invention also provides for an energy savings logic operation mode.

2. Background and Summary of the Invention

Conventional automatic transmissions include a hydrodynamic torque converter to transfer engine torque from the engine crankshaft to a rotatable input member of the transmission through fluid flow forces. The transmission includes frictional units which couple the rotating input member to one or more members of a planetary gear set. Other frictional units hold members of the planetary gear set stationary during flow of power. The drive clutch assemblies can couple the rotating input member of the transmission to the desired elements of the planetary gear sets, while the other frictional elements hold elements of these gear sets stationary. Such transmission systems also typically provide for one or more planetary gear sets in order to provide various ratios of torque and to ensure that the available torque and the respective reactive power demand are matched to each other.

Automatic transmissions are typically provided with a hydraulic control system and associated electronic controller which take automatic control of the friction units, gear ratio electing, and gear shifting. The hydraulic control system includes various fluid passages connected between valves which are controllable for applying and releasing the friction clutch elements in order to shift the gears of the transmission based upon the controls provided by the electronic controller. The electronic controller typically chooses the proper gear dependant upon a shift program selection, accelerator position, engine condition, and vehicle speed. The hydraulic control system uses several valves to direct and regulate the supply of hydraulic pressure to the clutch elements. The hydraulic pressure control causes either the actuation or de-actuation of the respective frictional clutch units for effecting gear ratio changes in the transmission. The valves used in the hydraulic control circuit typically comprise spring-biased spool valves, spring-biased accumulators and ball check valves. Since many of the valves rely upon springs to provide a predetermined amount of force, it will be appreciated that each transmission design represents a finely tuned arrangement of interdependent valve components.

Conventional automatic transmissions rely upon electronic controls. Accordingly, if a malfunction in the controller or electronics occurs, the vehicle may be rendered inoperable. Thus, it is an object of the present invention to provide a failsafe operation where the vehicle can be operated by movement of the manual valve (manually movable with a PRNDL shift lever) in order to engage certain clutch elements of the automatic transmission. According to this aspect of the present invention, a hydraulic control system is provided for an automatic transmission including a planetary gear system having at least one clutch element engagable to change the torque ratio of the transmission. The hydraulic control system includes a pressurized fluid source, a manual valve selectively movable between a plurality of positions in communication with the pressurized fluid source. A first fluid passage communicates with the at least one clutch element and the manual valve. The first fluid passage includes a normally closed solenoid valve. A second fluid passage communicates with the at least one clutch element and the manual valve and includes a normally open solenoid valve. The hydraulic control system is capable of engaging the at least one clutch element with the manual valve in a predetermined position and the normally closed solenoid valve in an energized, open state and the normally open solenoid valve in an energized, closed state. The hydraulic control system is further capable of engaging the at least one clutch element with the manual valve in the predetermined position and the normally closed and the normally open solenoid valve de-energized. In this state of operation, the hydraulic control system is provided with a failsafe mode of operation which does not require the electronic controls.

Hydraulic control systems often include a manual valve which can be operated to selectively engage various clutches of the planetary gear system. However, during movement of the manual valve, interrupted friction element control typically occurs. The present invention provides a unique manual valve arrangement which provides for uninterrupted friction element control while manual valve porting is being switched. Thus, the engagement of certain clutch elements can be maintained even though manual valve porting is switched between a drive position and a second or low position.

The unique manual valve and solenoid arrangement of the present invention also permits an energy savings logic to be used. Since in some gear positions a multi-select solenoid is connected to the friction element which is being applied, application of the friction element can be maintained by turning electrical power off to both of the solenoids thereby saving electrical power.

With conventional automatic transmission designs, the lubrication and cooler systems are provided in series. Thus, when the lubrication system is under high demand, lubrication starvation can become a problem. The transmission of the present invention has a unique arrangement of lube and cooler circuits. The lubrication and cooler circuits are fed in parallel. One path which provides gear train lubrication flow is maintained with a regulated pressure so that regardless of the demand which may increase due to centrifugal effects, the control pressure is maintained in order to regulate lubrication flow in order to meet component lubrication requirements. The cooler circuit is routed through the torque converter then to the cooler which is directed back into the pump suction. By routing the fluid into the pump inlet, a portion of the fluid energy is saved by using fluid velocity to help fill the pump.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2A is a table illustrating the applied clutches for each gear ratio of the transmission according to the principles of the present invention;

FIG. 14 is a schematic diagram of the hydraulic control system in the overdrive mode with energy saving logic;

FIG. 16 is a schematic diagram of the hydraulic control system in the reverse mode.

DETAILED DESCRIPTION OF THE PREFERRED EMBODIMENTS

Figure 2:
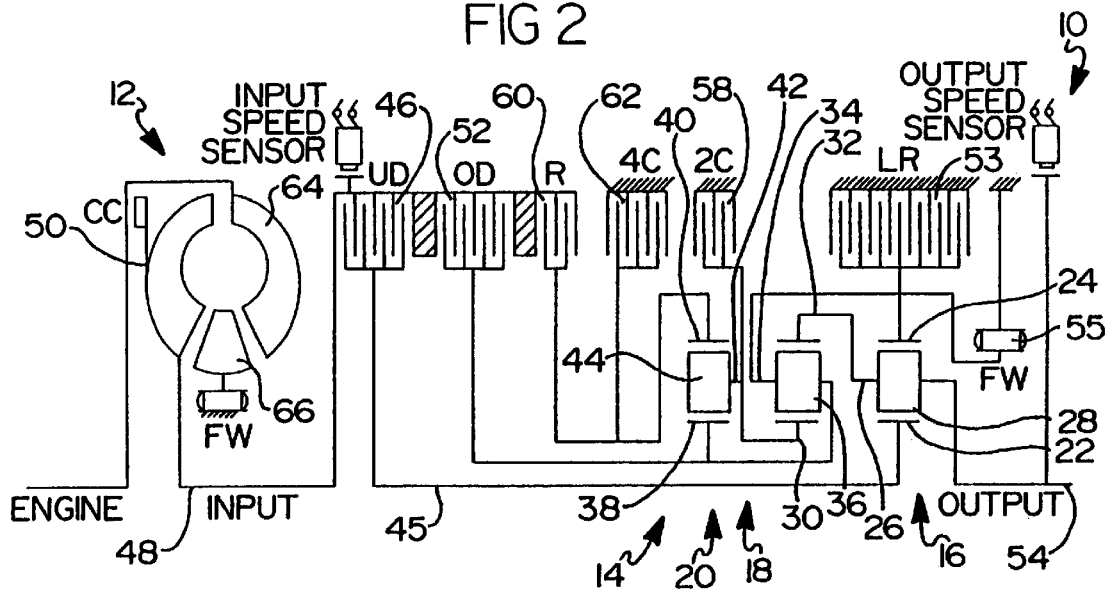
FIG. 2 is a schematic diagram of the transmission gear train according to the principles of the present invention.

With reference to FIG. 2, a rear wheel drive four-speed automatic transmission 10 is shown, according to the principles of the present invention. The automatic transmission 10 includes a torque converter 12 which is operably connected to a multiple planetary gear system 14. The multiple planetary gear system 14 includes a first planetary gear assembly 16, a second planetary gear assembly 18, and a third planetary gear assembly 20. The first planetary gear assembly 16 includes a sun gear 22, an annulus gear 24, a planetary carrier assembly 26, and a plurality of planetary gears 28 rotatably mounted to the planetary carrier 28. The second planetary gear assembly 18 includes a sun gear 30, an annulus gear 32, a planetary carrier 34, and a plurality of planetary gears 36 rotatably mounted on the planetary carrier 34. The third planetary gear assembly 20 includes a sun gear 38, an annulus gear 40, a planetary carrier 42, and a plurality of planetary gears 44 rotatably mounted on the planetary carrier 42.

The sun gear 22 of the first planetary gear assembly 16 is selectively driven by engagement of an underdrive clutch 46 with an input shaft 48 which is driven by a turbine 50 of the torque converter 12. The annulus gear 24 of the first planetary gear assembly 16 is attached to the planetary carrier 34 of the second planetary gear assembly 18 which is also attached to the sun gear 38 of the third planetary gear assembly 20. Each of these elements are selectively engaged by an overdrive clutch 52 which engages the annulus gear 24 of first planetary gear assembly 16, the carrier assembly 34 of the second planetary gear assembly 18, and the sun gear 38 of the third planetary gear assembly to the input shaft 48. The planetary carrier 26 of the first planetary gear assembly 16 is attached to an output shaft 54 and is also attached to the annulus gear 32 of the second planetary gear assembly 18. The sun gear 30 of the second planetary gear assembly 18 is attached to the planetary carrier 42 of the third planetary gear assembly 20 which is engagable by a second gear clutch 58 which is engagable to prevent rotation of the carrier 42 and sun gear 30 relative to the transmission housing. The annulus gear 40 of the third planetary gear assembly 20 is engagable by a reverse clutch 60 for selectively engaging the annulus gear 40 with the input shaft 48. In addition, the annulus gear 40 of the third planetary gear assembly 20 is also engagable with a fourth gear clutch 62 for preventing rotation of the annulus gear 40 relative to the transmission housing.

The torque converter 12 includes an impeller 64 which is attached to the engine (not shown). As the engine drives the impeller 64, fluid which is propelled by the blades of the impeller 64 drive the turbine 50 in order to drive the input shaft 48. The stator 66 directs the fluid from the turbine 50 back to the impeller 64 in order to achieve torque multiplication, as is well known in the art.

FIG. 2a illustrates the different operating modes of the automatic transmission, as shown in FIG. 2. In particular, in order to obtain a reverse gear operation, the reverse clutch 60 and low reverse clutch 53 must be applied. In order to provide improved neutral-to reverse shift quality, the low/reverse clutch 53 is applied in neutral. In order to obtain first gear, the underdrive clutch 46 and the free wheel clutch 55 or the low/reverse clutch 53 must be applied. In order to obtain second gear, the underdrive clutch 46 and second gear clutch 58 must be applied. In order to obtain a second prime ($2^{nd}$) gear, the underdrive clutch 46 and fourth gear clutch 62 must be applied. In order to obtain the direct gear ($3^{rd}$), the underdrive clutch 46 and overdrive clutch 52 must be applied. In order to obtain fourth gear, the underdrive clutch 52 and fourth gear clutch 62 must be applied. In order to obtain a fourth prime gear ($4^{th}$), the underdrive clutch 52 and second gear clutch 58 must be applied.

Figure 1:
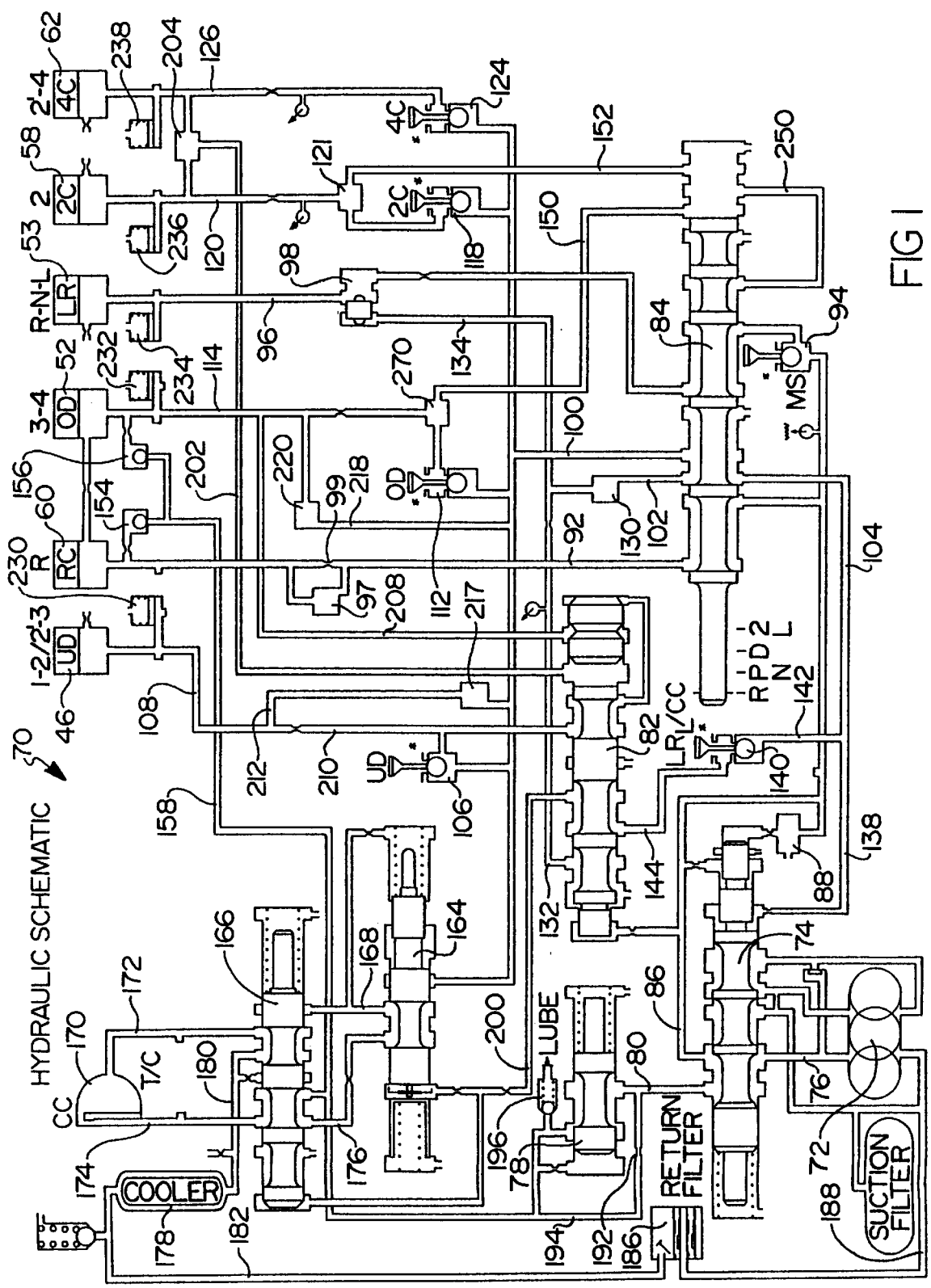
FIG. 1 is a schematic view of the hydraulic control system of the automatic transmission according to the principles of the present invention.

With reference to FIG. 1, the hydraulic control system 70, for selectively engaging the underdrive clutch 46, overdrive clutch 52, low/reverse clutch 53, second gear clutch 58, fourth gear clutch 62, and reverse gear clutch 60, will now be described. The hydraulic control system 70 includes a pump 72 which supplies hydraulic fluid to a regulator valve 74 via passage 76. The regulator valve 74 distributes hydraulic fluid under pressure to the torque converter limit valve 78 via fluid passage 80 as well as to the end of the solenoid switch valve 82 and to the manual valve 84 via passage 86. A variable force solenoid 88 is disposed between the hydraulic passage 86 and the end chamber of the regulator valve 74.

In the reverse "R" position of the manual valve 84 (as shown in FIG. 16), hydraulic fluid is communicated to the reverse clutch 60 via passage 92 and to the low/reverse clutch 53, when the multi-select solenoid 94 is de-energized, via passage 96. A ball check valve 97 is provided in bypass relationship to a restriction 99 in passage 92. A low/reverse switch valve 98 is provided in the passage 96. In order to block a transmission shift to the reverse gear, the transmission controller, in response to a detected vehicle speed which exceeds a predetermined value (for example, 8 mph), holds the multi-select solenoid 94 in the activated condition so that the low/reverse clutch 53 cannot be actuated.

Figure 8:
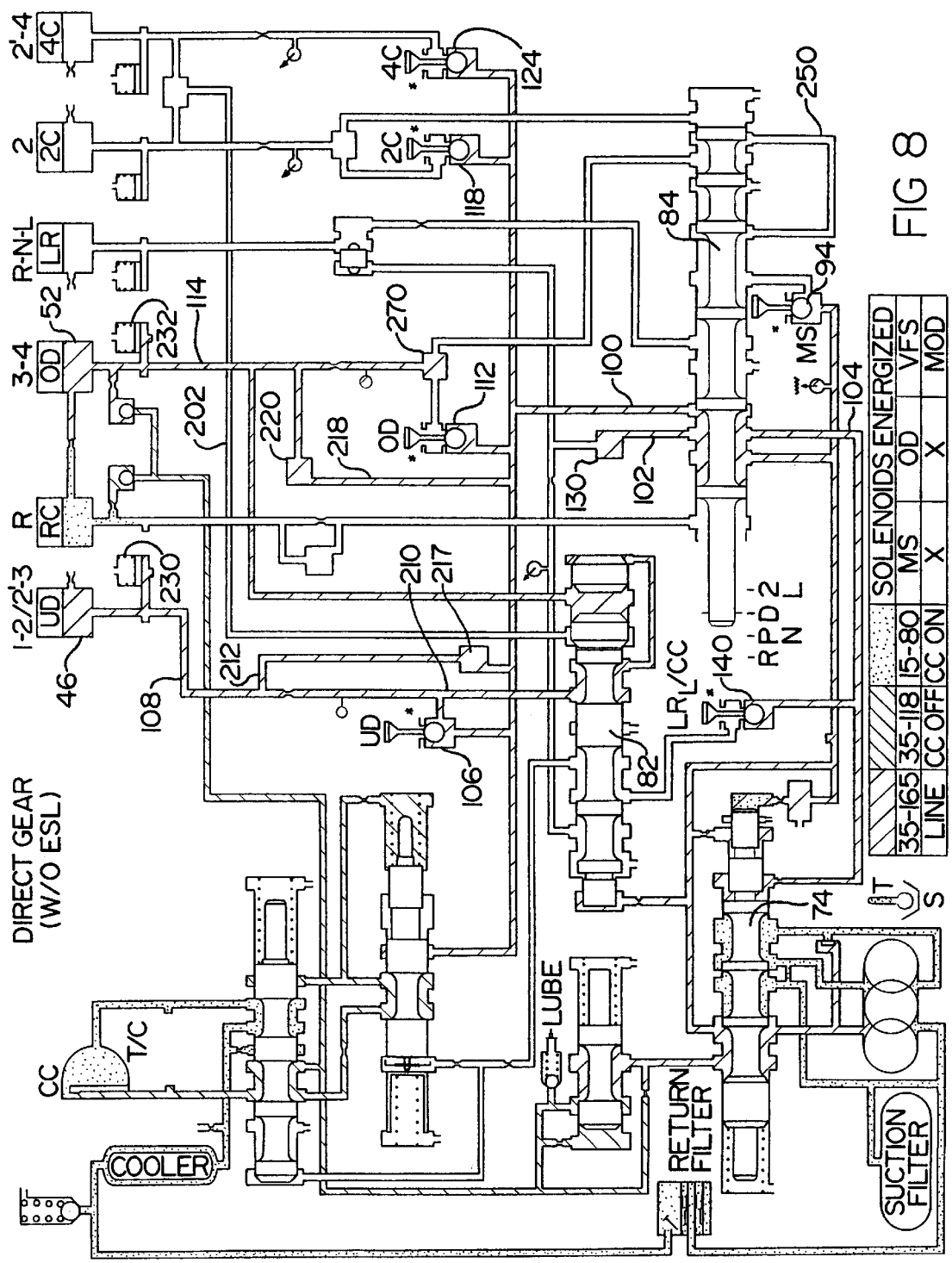
FIG. 8 is a schematic view of the hydraulic control system in the direct gear mode without energy saving logic.

When the manual valve 84 is in the drive "D" position, hydraulic fluid is delivered to the passages 100, 102, and 104, as shown in FIG. 8. Upon deactivation of the underdrive clutch solenoid 106, hydraulic fluid can be delivered to the underdrive clutch 46 from passage 100 via passage 108. By activation of the overdrive clutch solenoid 112, hydraulic fluid can be delivered to overdrive clutch 52 via passage 114. Through actuation of second gear clutch solenoid 118, hydraulic fluid can be delivered to the second gear clutch 58 from passage 100 via passage 120 through dual acting ball check valve 121. By actuating fourth gear clutch solenoid 124, hydraulic fluid can be delivered to the fourth gear clutch 62 from passage 100 via passage 126.

Ball check valve 130 allows flow from passage 134 to passage 102. Passage 132 communicates with solenoid switch valve 82 and passage 134. Passage 104 delivers hydraulic fluid to the regulator valve 74 via passage 138 and to a low/reverse torque converter clutch solenoid valve 140 via passage 42. When in the energized position, the low/reverse torque converter clutch solenoid valve 140 delivers hydraulic fluid to the solenoid switch valve 82 via passage 144 providing that the manual valve 84 is not in the reverse position. Hydraulic fluid can additionally be delivered to the overdrive clutch 52 via passage 150 which communicates with the manual valve 84. Hydraulic fluid can also be communicated to the second gear clutch 58 via passage 152 which communicates with the manual valve 84.

The reverse clutch 60 and overdrive clutch 52 are each provided with dribbler valves 154, 156, respectively which allow a slow flow of hydraulic fluid into the reverse clutch 60 and overdrive clutch 52, respectively to help keep air purged from the clutches when they are not pressurized.

Pressurized fluid is delivered to the torque converter control valve 164 via passage 100. The torque converter control valve 164 communicates pressurized fluid to the torque converter switch valve 166 via hydraulic passage 168. The torque converter switch valve 166 communicates pressurized fluid to the torque converter clutch 170 via passage 172. Hydraulic fluid is also communicated between the back side of the torque converter clutch 170 and the torque converter switch valve 166 via passage 174.

Hydraulic fluid is communicated between the torque converter control valve 164 and the torque converter switch valve 166 via passage 176. Hydraulic fluid is communicated between the torque converter switch valve 166 and a cooler device 178 via passage 180. The hydraulic fluid from the cooler 178 is communicated via passage 182 to a return filter 186 which communicates hydraulic fluid through passage 188 to the pump 72. Hydraulic fluid is communicated at a reduced pressure from line 80 through restriction 192 to passage 194 which communicates with the torque converter switch valve 166 and to an input shaft lube valve 196. Pressurized fluid is communicated between the solenoid switch valve 82, the torque converter control valve 164, and the torque converter switch valve 166 via passage 200.

Hydraulic fluid is communicated between the solenoid switch valve 82, the second gear clutch 58, and fourth gear clutch 62 via passage 202 which communicates with the three-way ball check valve 204. Hydraulic fluid is communicated between the solenoid switch valve 82 and the overdrive clutch 52 via passage 208 which communicates with passage 114. Hydraulic fluid is communicated between the solenoid switch valve 82 and the underdrive clutch 46 via passage 210 which communicates with passage 108. A bypass line 212 is provided between fluid passage 100 and fluid passage 108 which communicates with the underdrive clutch 46 through ball check 217. A bypass line 218 is provided between fluid line 100 and fluid passage 114 which communicates with overdrive clutch 52 through ball check 220.

The fluid passage 108 which communicates with the underdrive clutch 46 is provided with an accumulator 230. The passage 114 which communicates with the overdrive clutch 52 is provided with accumulator 232. The passage 96 which communicates with the low/reverse clutch 53 is provided with an accumulator 234. The passage 120 which communicates with the second gear clutch 58 is provided with an accumulator 236, and the passage 126 which communicates with the fourth gear clutch 62 is provided with an accumulator 238.

Figure 3:
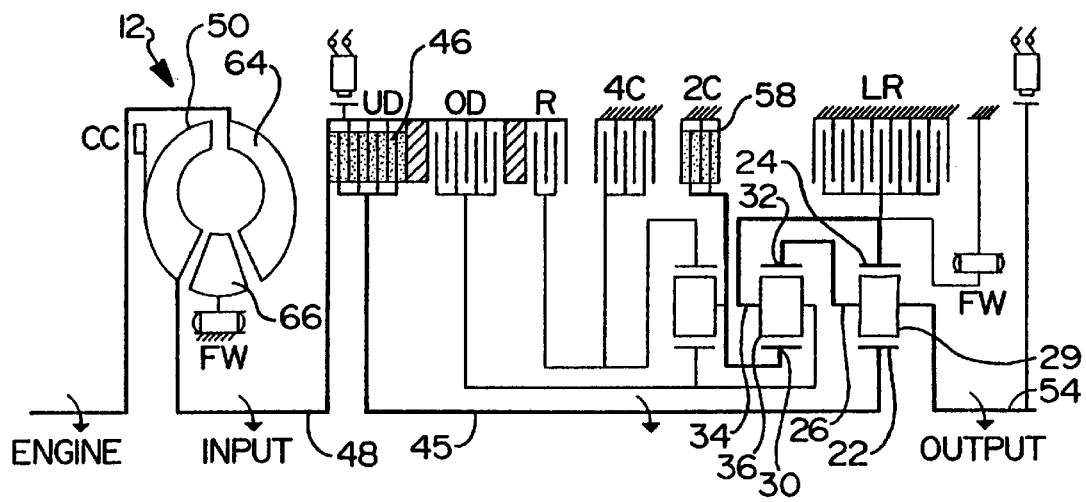
FIG. 3 is a schematic diagram of the automatic transmission of the present invention illustrating the torque flow for second gear of the transmission.

With reference to FIG. 3, a schematic diagram of the automatic transmission 10 is shown illustrating the torque path for the transmission when operated in second gear. In the second gear operating mode, the underdrive clutch 46 and second gear clutch 58 are each engaged. Accordingly, the engine drives the impeller 64 which in turn drives the turbine 50 of the torque converter 12. The turbine 50 drives the input shaft 48 which in turn drives the sun gear 22 of the first planetary gear assembly 16 via shaft 45. As the sun gear 22 rotates, planetary gears 28, which are supported on planetary carrier 26, are rotated. The planetary carrier 26 is attached to the annulus gear 32 of the second planetary gear set 18 which drives the planetary gears 36 mounted on the planetary carrier 34 of the second planetary gear assembly 18 which is in turn connected to the annulus gear 24 of the first planetary gear assembly 16. Thus, the output shaft 54 which is attached to the planetary carrier 26 and annulus gear 32, is driven at a 1.67 torque ratio relative to the input shaft 48.

Figure 4:
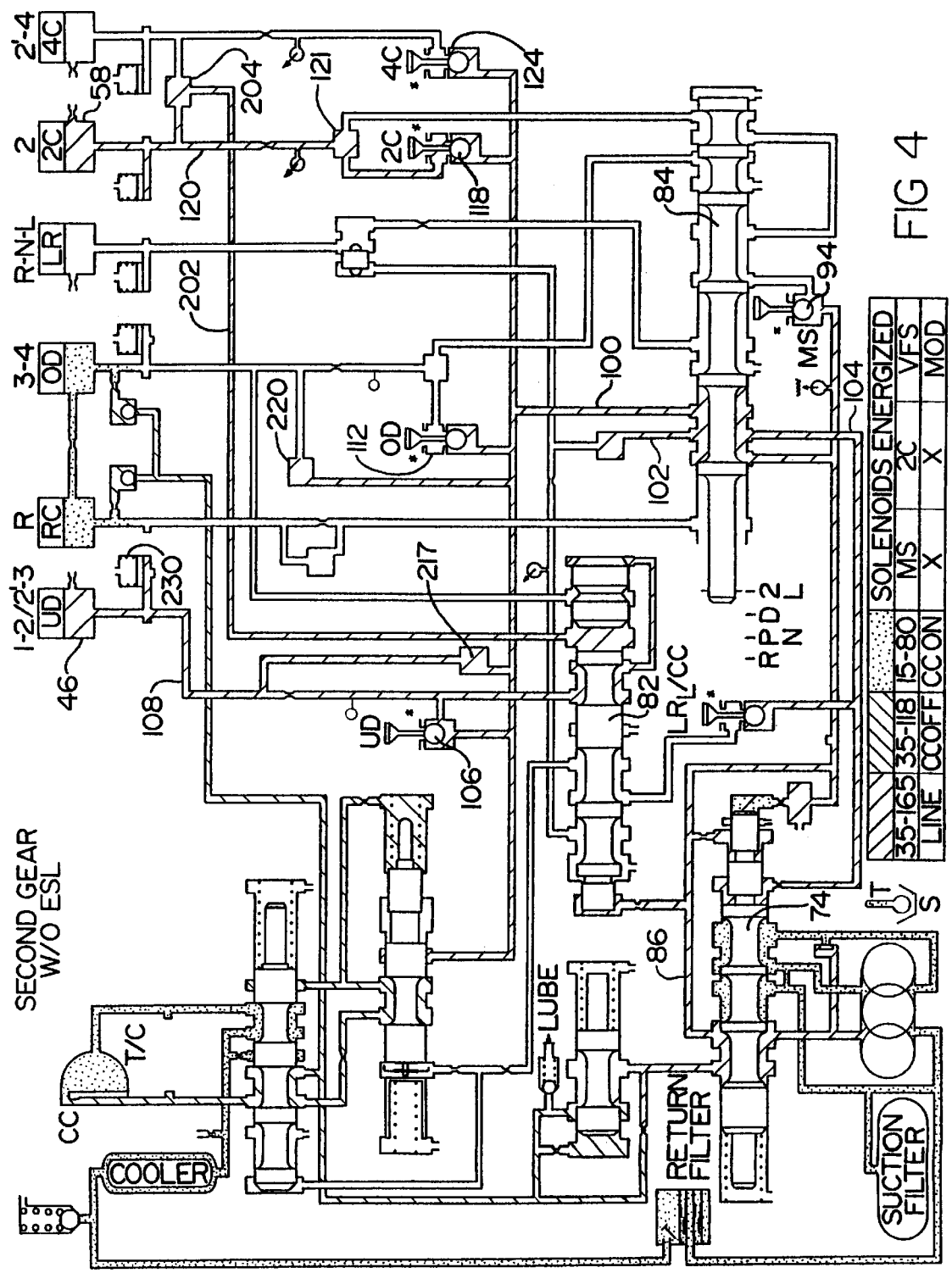
FIG. 4 is a schematic diagram of the hydraulic control system illustrating the hydraulic control system in second gear without energy saving logic.

With reference to FIG. 4, the hydraulic control system is shown for operation in second gear. In particular, the manual valve 84 is in the "2" position and the second gear clutch solenoid 118 is energized along with the multi-select solenoid 94 and the underdrive clutch solenoid 106 is de-energized in its normally open position so that hydraulic fluid is delivered through passage 100 and communicated to passage 108 for actuating underdrive clutch 46 and hydraulic fluid is communicated to passage 120 for actuating second gear clutch 58. In the second gear operating mode, without energy saving logic, the multi-select solenoid valve 94 is energized, as well as the second gear clutch solenoid 118.

Once in second gear, the control strategy can be converted to an energy saving logic mode wherein the multi-select solenoid valve 94 and the second gear clutch solenoid 118 are de-energized and hydraulic fluid is then communicated through passage 250 to communicate with passages 152 and 120 which provide pressurized fluid to the second gear clutch 58, bypassing the second gear clutch solenoid 118. In the energy saving logic mode, the energy that was required for operating the second gear clutch 58 via energizing the second gear clutch solenoid 118 and the multi-select solenoid 94 is conserved while second gear can still be maintained. Meanwhile, the communication of pressurized fluid to the underdrive clutch 46 is still maintained through alternate passage 100 which communicates with passage 108 through underdrive solenoid 106 which is de-energized.

Figure 6:
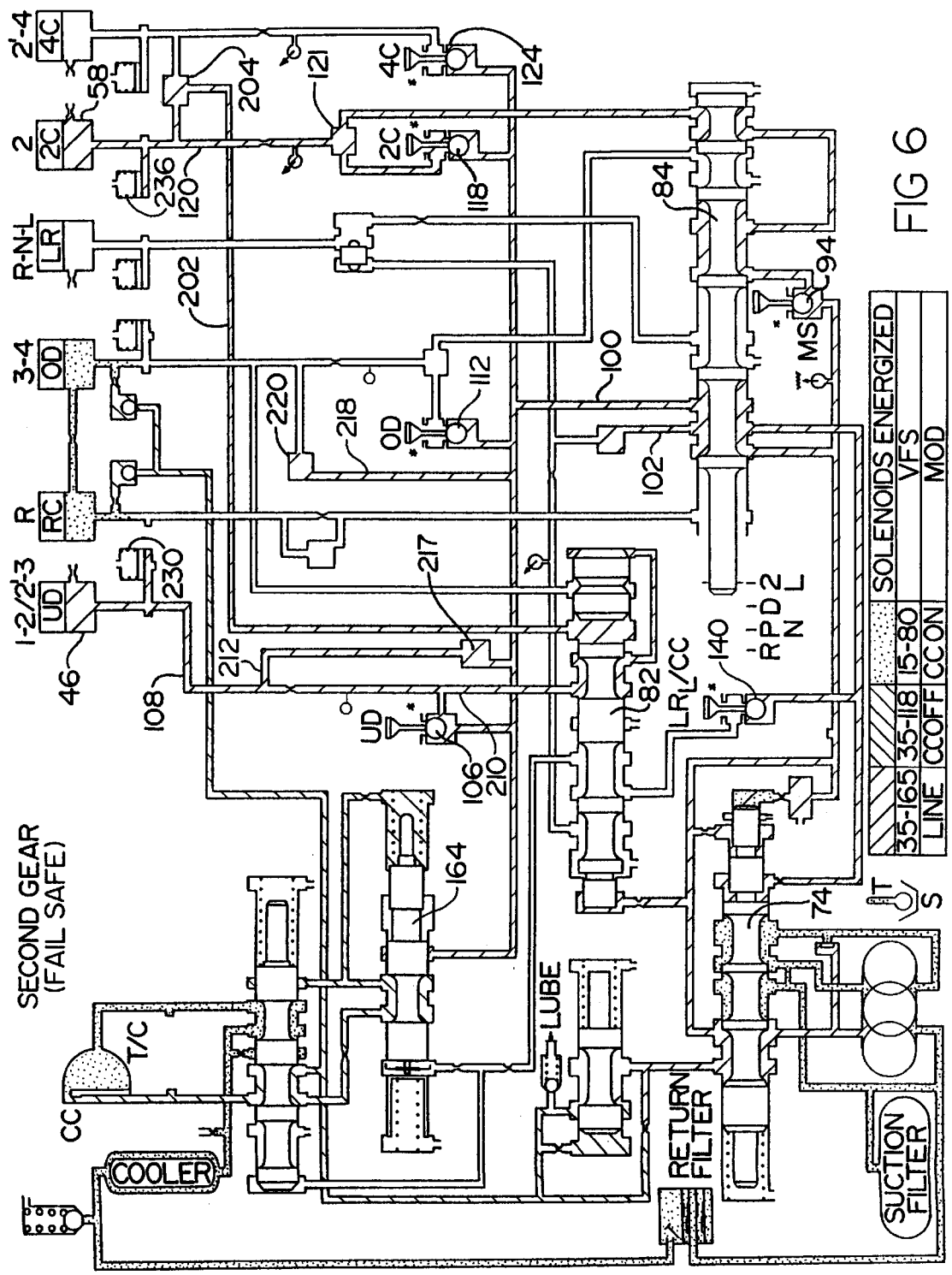
FIG. 6 is a schematic view of the hydraulic control system of the present invention with the hydraulic control system in second gear under failsafe operation.

With reference to FIG. 6, the hydraulic control system is shown in a second gear failsafe mode of operation. In this mode, second gear is provided when the gear selector is in the second position ("2") and the electronic transmission is in power/off or default mode such as in the case of a malfunction which may occur wherein the transmission controller may perform a logical shut-down. In the second gear failsafe mode of operation, the fluid communication to the underdrive clutch 46 and second gear clutch 58 is essentially the same as in the second gear energy saving logic mode of operation. However, in the second gear energy saving logic mode of operation, the transmission controller is still fully operational and no malfunction is present.

Figure 7:
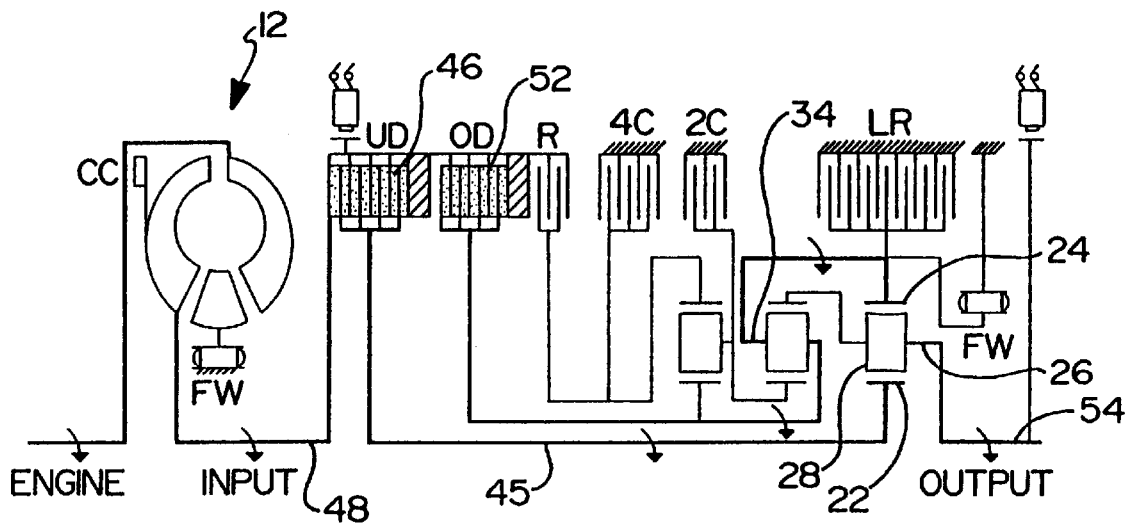
FIG. 7 is a schematic view of the automatic transmission gear train illustrating the torque flow path for direct drive ($3^{rd}$ gear)

With reference to FIG. 7, the automatic transmission gear train is shown in the direct gear mode of operation. In direct gear the underdrive clutch 46 is engaged for providing driving torque to the shaft 45 which in turn drives the sun gear 22 of the first planetary gear assembly 16. The overdrive clutch 52 is also engaged and provides torque to the planetary carrier 34 of the second planetary gear assembly 18 as well as the annulus gear 24 of the first planetary gear assembly 16. In this mode of operation, the output shaft 54 is driven at a 1.0 torque ratio to the input shaft 48. In other words, as the annulus gear 24 and sun gear 22 of the first planetary gear assembly 16 rotate at the same speed, the planetary gears 28 of the first planetary gear assembly 16 are not allowed to rotate, therefore the planetary carrier 26 also rotates at the same speed as the sun gear 22 and annulus gear 24. Therefore, the output shaft 54 drives at the same speed as the input shaft 48 in the direct drive mode of operation.

With reference to FIG. 8, the hydraulic control system is shown in a direct gear mode of operation without energy saving logic. In particular, the manual valve 84 is in the "D" position and the multi-select solenoid valve 94 and the overdrive solenoid valve 112 are energized. Hydraulic fluid is communicated to the underdrive clutch 46 from passage 100 via passage 108 through underdrive clutch solenoid 106 which is de-energized. Furthermore, hydraulic pressure is communicated to the underdrive clutch 52 through the energized underdrive clutch solenoid 112 via passage 114.

First and direct gear operation as defined above is not altered by a change in manual valve position from "D" to "2" or "L" since hydraulic pressure from passage 86 to passage 100 is maintained.

By de-energizing the multi-select solenoid 94 and overdrive clutch solenoid 112, direct gear can be maintained in an energy saving logic mode (shown in FIG. 9) while the manual valve 84 is in the "D" position. In particular, as the multi-select solenoid valve 94 is de-energized, fluid communication is provided to passage 250 by the manual valve 84 which in turn provides fluid communication through passage 150 through three-way ball check valve 270 to fluid passage 114 which communicates with overdrive clutch 52. The fluid communication to underdrive clutch 46 in the energy saving logic mode is the same as operation without energy saving logic. As a matter of illustration, the engagement of the torque converter clutch is shown in FIG. 10. In this mode of operation, the low/reverse torque converter clutch solenoid 140 is energized to provide fluid communication through passage 144 to the solenoid switch valve 82. The solenoid switch valve 82 provides fluid communication to the torque converter control valve 164 and torque converter switch valve 166 via passage 200. The torque converter switch valve 166 provides fluid communication through passage 172 to the torque converter clutch 170 for engagement thereof. It should be noted that the engagement of the torque converter clutch 170 has been described with respect to the direct gear mode of operation, but is essentially the same in each of the other modes of operation when application of the torque converter clutch is desired.

Figure 9:
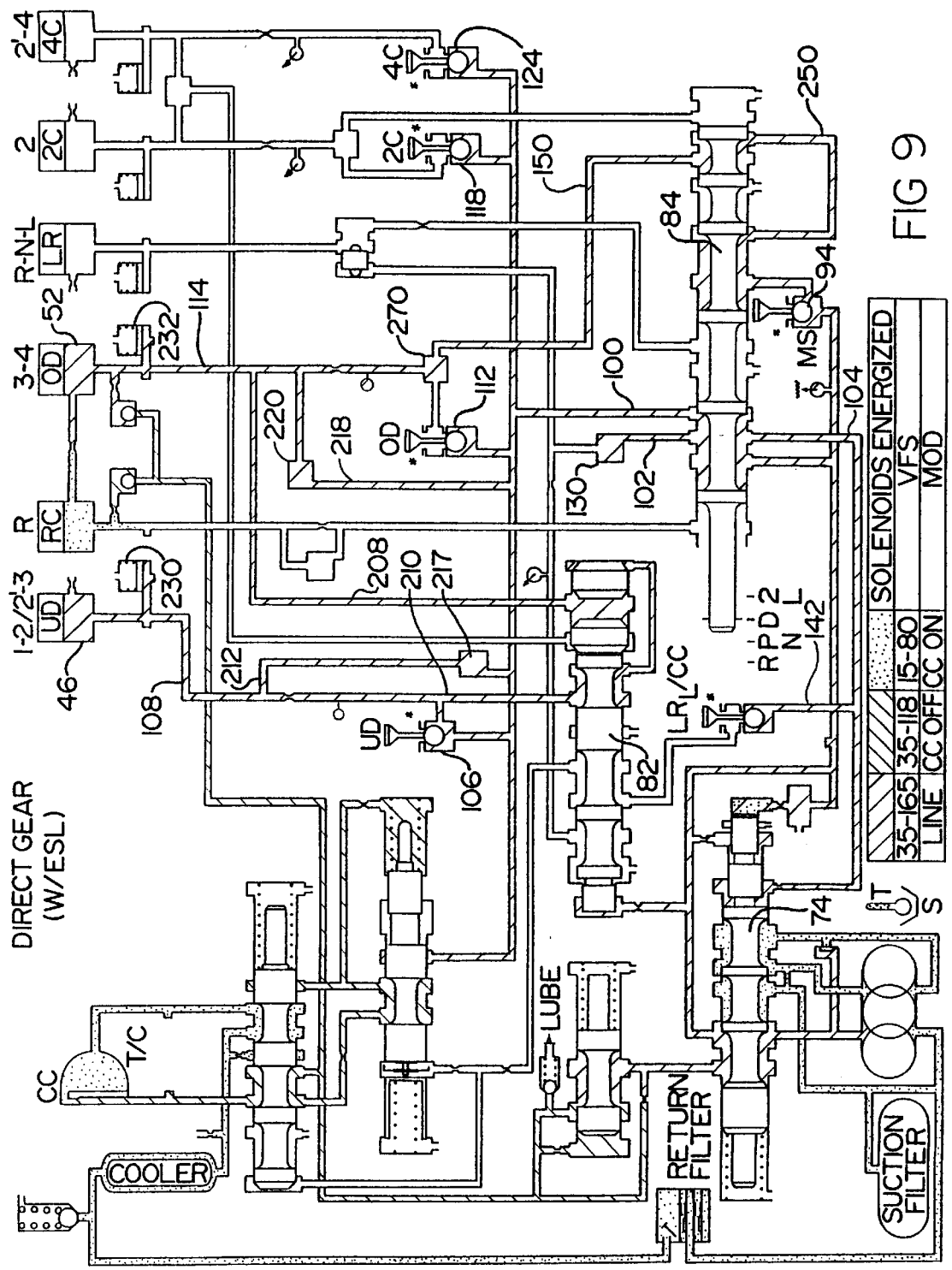
FIG. 9 is a schematic diagram of the hydraulic control system with the control system in the direct gear mode with energy saving logic.
Figure 10:
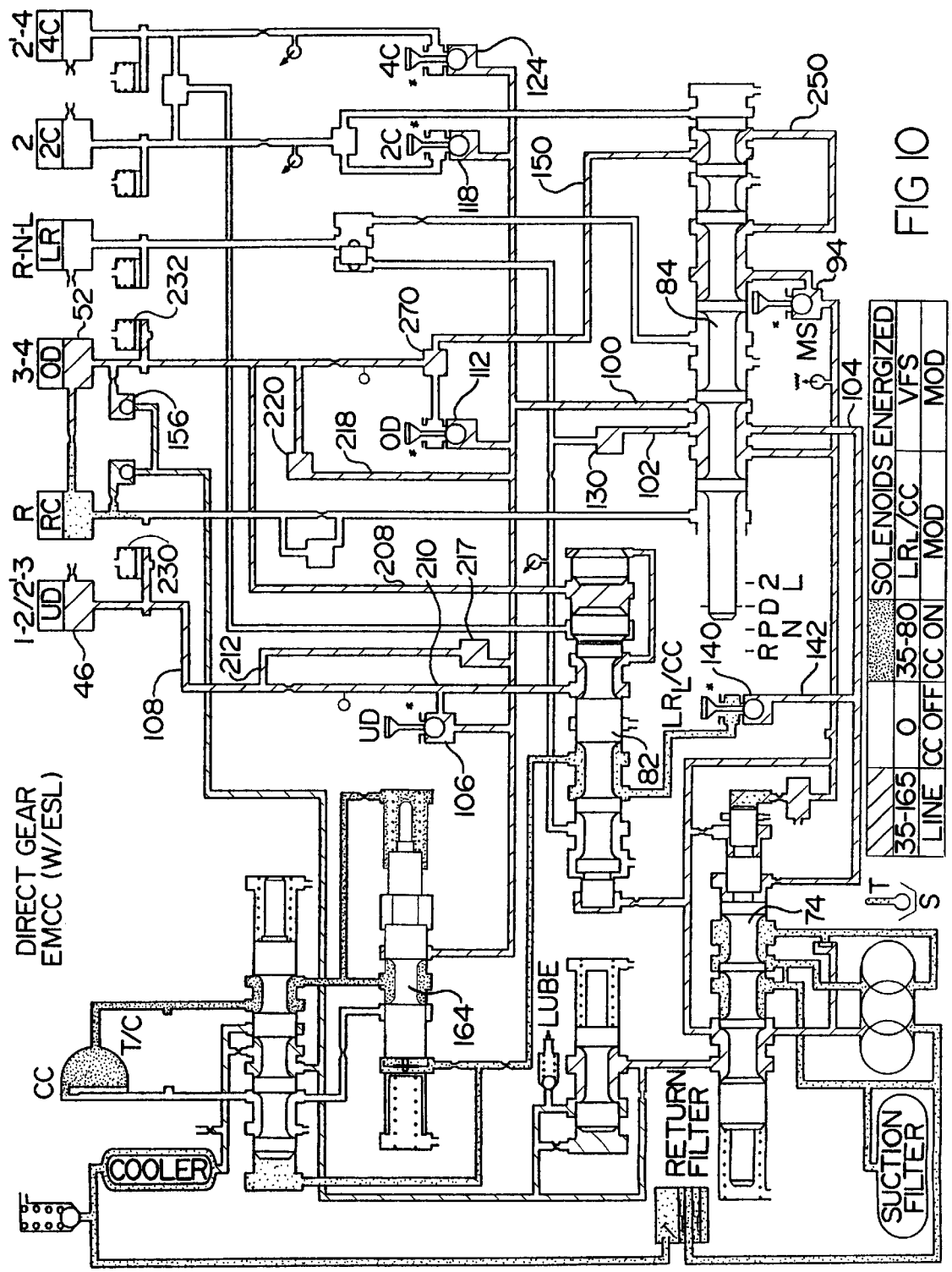
FIG. 10 is a schematic diagram of the hydraulic control system in the direct gear mode with the torque converter clutch engaged and with energy saving logic.
Figure 11:
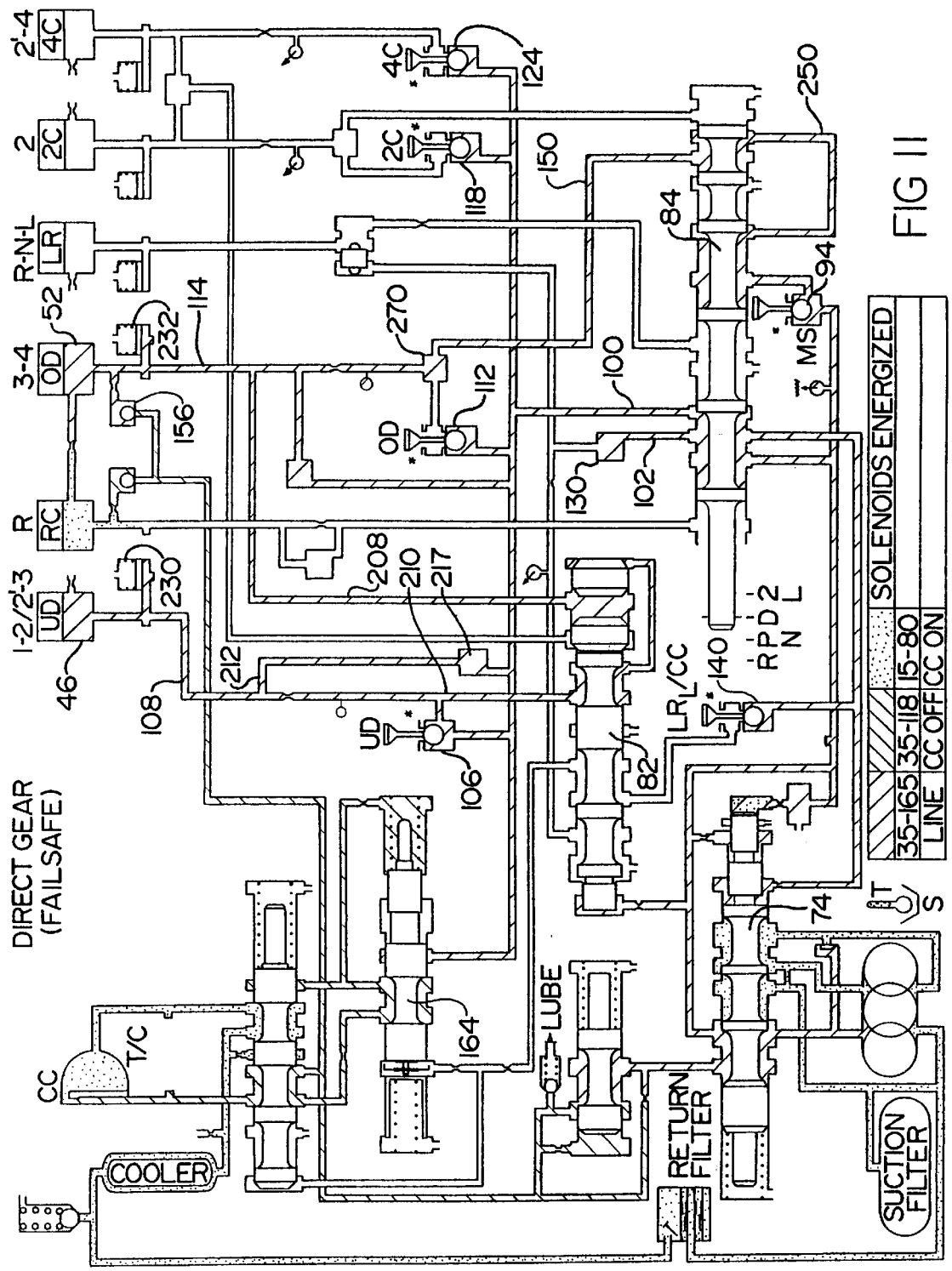
FIG. 11 is a schematic diagram of the hydraulic control system of the present invention in direct gear with failsafe operation.

The direct gear failsafe mode of operation (shown in FIG. 11) is obtained essentially through the same passages as the direct gear with energy saving logic mode of operation as shown in FIG. 9. However, during the failsafe mode of operation, the transmission controller has detected a malfunction and has performed a logic shutdown.

Figure 12:
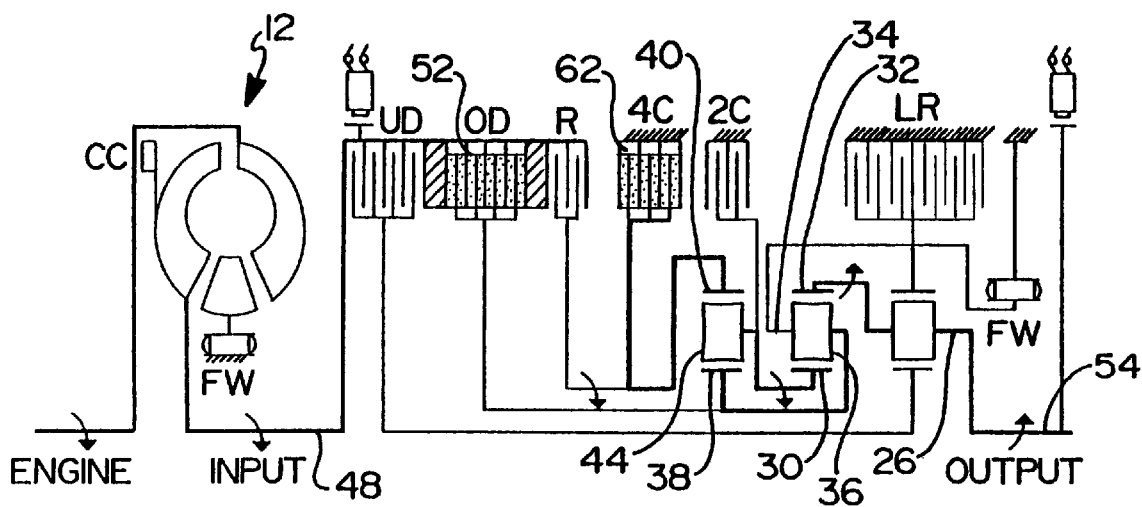
FIG. 12 is a schematic view of the transmission gear train illustrating the torque flow path for overdrive gear.

With reference to FIG. 12, the automatic transmission of the present invention is shown in the overdrive mode of operation wherein the overdrive clutch 52 and fourth gear clutch 62 are each engaged. Engagement of the overdrive clutch 52 transmits torque from the input shaft 48 to the planetary carrier 34 of the second planetary gear assembly 18 and the sun gear 38 of the third planetary gear assembly 20. Engagement of the fourth gear clutch 62 prevents rotation of the annulus gear 40 of the third planetary gear assembly 20. Thus, as the input shaft 48 transmits torque through overdrive clutch 52, the output shaft 54 is driven at a 0.75 torque ratio relative to the input shaft 48.

Figure 13:
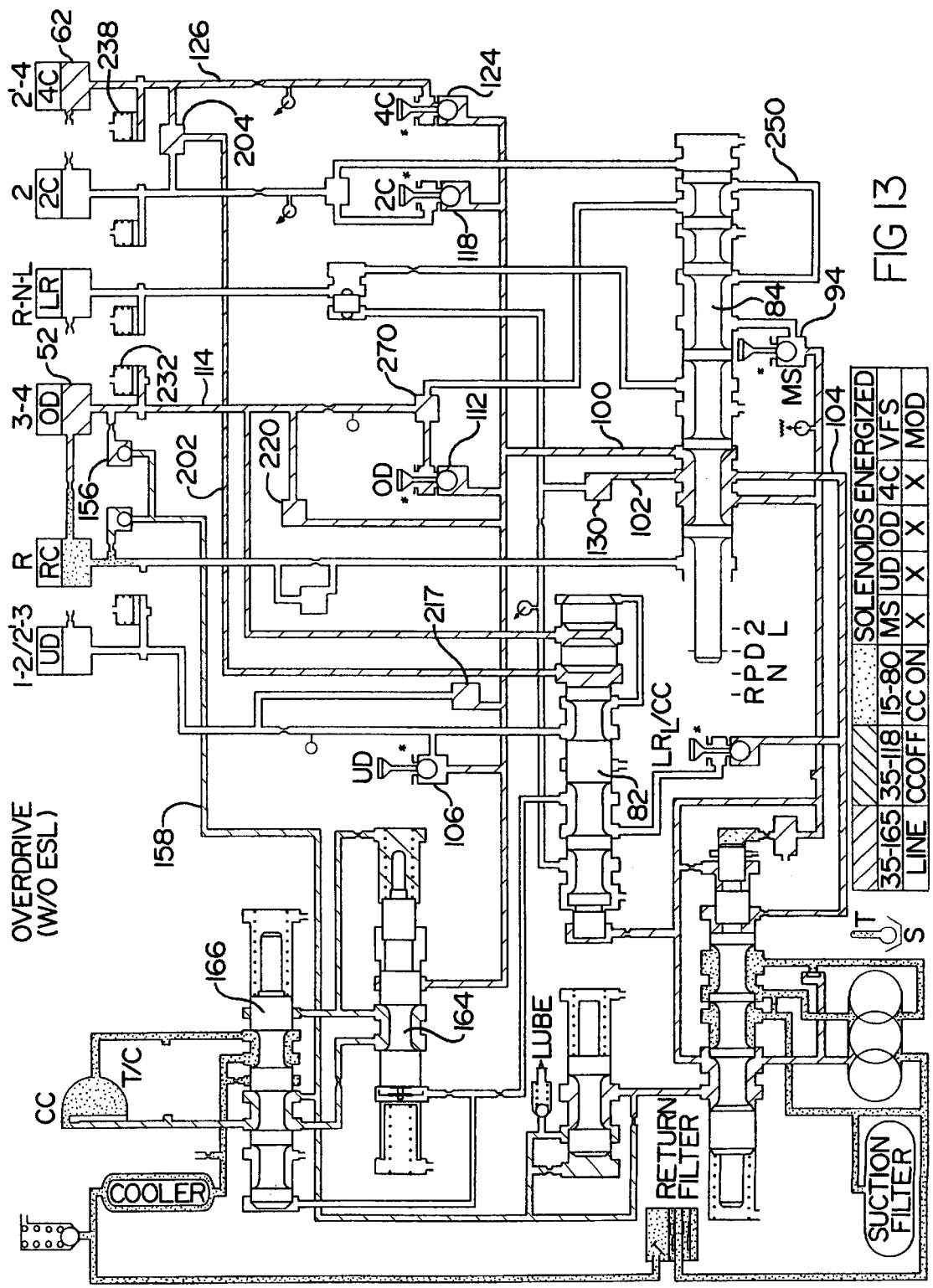
FIG. 13 is a schematic diagram of the hydraulic control system illustrating the overdrive mode without energy saving logic.

With reference to FIG. 13, the hydraulic control system is shown in the overdrive mode with the overdrive clutch 52 and fourth gear clutch 62 each engaged without energy saving logic. In the overdrive mode without energy saving logic, the multi-select solenoid valve 94, the underdrive clutch solenoid 106, the overdrive clutch solenoid 112, and the fourth gear clutch solenoid 124 are each energized. Fluid communication is provided through the manual valve 84 via line 100 to passage 114 which communicates fluid to the overdrive clutch 52. Furthermore, fluid is communicated between passage 100 and passage 126 through fourth gear clutch solenoid 124 for engaging fourth gear clutch 62.

Overdrive gear can also be maintained in an energy saving logic mode (shown in FIG. 14) by de-energizing the multi-select solenoid valve 94 and the overdrive clutch solenoid 112. In the overdrive gear with energy saving logic, fluid communication is provided through the multi-select solenoid valve 94 through the manual valve 84 to passage 250. Fluid is also communicated through passage 150 to the three-way ball check valve 270 and into passage 114 for engaging overdrive clutch 52. In the energy saving logic mode, the underdrive clutch solenoid 106 and fourth gear clutch solenoid 124 remain energized while the energy savings is obtained by de-energizing the multi-select solenoid valve 94 and overdrive clutch solenoid 112. Fluid communication to the fourth gear clutch 62 is provided through passage 100 which communicates with passage 126 through the energized fourth gear clutch solenoid 124.

Figure 15:
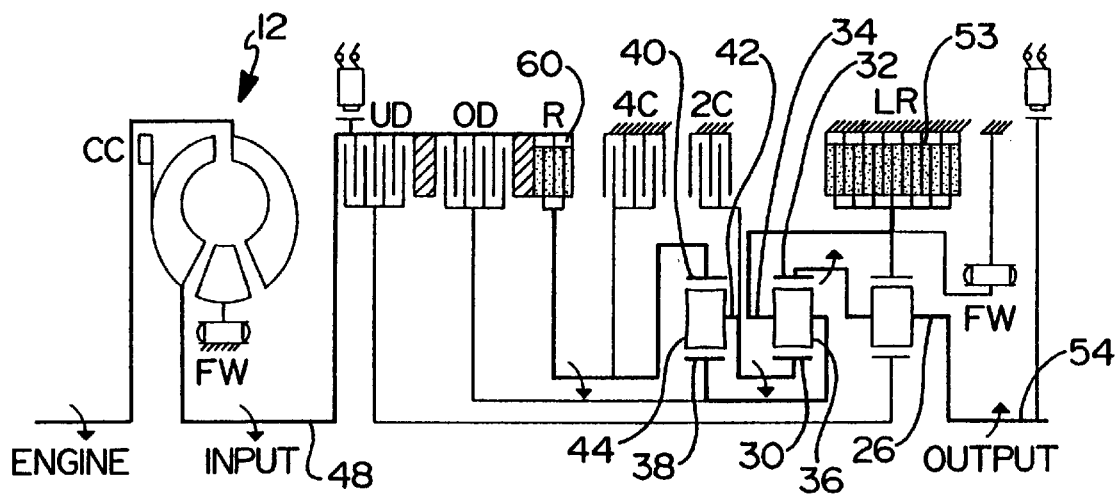
FIG. 15 is a schematic view of the gear train illustrating the torque flow path for reverse gear.

The automatic transmission of the present invention is shown in the reverse drive mode in FIG. 15. In the reverse drive mode, the reverse clutch 60 and low/reverse clutch 53 are each engaged. Thus, torque is delivered from the input shaft 48 to the annulus gear 40 of the third planetary gear assembly 20 via the reverse clutch 60. In addition, the annulus gear 24 of the first planetary gear assembly 16 and the carrier 34 of the second planetary gear assembly 18 as well as the sun gear 38 of the third planetary gear assembly 20 are each prevented from rotating by the engagement of the low/reverse clutch 53. Thus, as the annulus gear 40 of the third planetary gear assembly rotates, the planetary gears 44 of the third planetary gear assembly 20 cause rotation of the carrier 42 which is also connected to the sun gear 30 of the second planetary gear assembly 18. As the sun gear 30 rotates, the planetary gears 36 also rotate since the carrier 34 is fixed, thereby causing rotation of the annulus gear 32 which is connected to the output shaft 54. In the reverse gear, the torque ratio is 3.0 in the opposite direction of rotation of the input shaft.

With reference to FIG. 16, the hydraulic control system is shown in the reverse operating mode wherein the manual valve 84 is in the "R" position. Pressurized fluid is communicated to the reverse clutch 60 through passage 92 and hydraulic fluid is communicated to the low/reverse clutch 53 by passage 96. In order to achieve reverse gear, the multi-select solenoid valve 94 must be de-energized. In the event that a reverse gear shift is detected while the vehicle is moving forward at a speed exceeding a predetermined speed, the multi-select solenoid 94 remains energized in order to prevent a reverse shift. Reverse gear can be obtained in a failsafe operating mode simply by placing the manual valve 84 in the "R" position wherein the controller logic is shut down and the multi-select solenoid 94 is automatically de-energized.

The unique manual valve arrangement of the present invention provides for uninterrupted friction element control even though manual valve porting is being switched. The extra multi-select solenoid 94 combined with porting through a manual valve 84 and dual acting ball check assemblies 121, 270 permits select friction elements to be controlled from two solenoids simultaneously. The strategy uses output from the transmission range sensor to determine when the manual shift selector has been positioned between gear detents to use the appropriate solenoid for friction element control. A back-up strategy relies on pressure switch status if the transmission range sensor signal is not reliable.

Output from the multi-select solenoid 94 is switched by the manual valve to the overdrive clutch (in drive selector position), the second gear clutch in second gear selector position, and reverse in the reverse selector position.

The transmission of the present invention provides two forward selectable drive gears and reverse in a power-off or default mode of operation. If a malfunction should occur, the transmission controller may perform a logical shut-down during which the transmission would be capable of operating in a failsafe mode. With the manual shift selector in the "drive" position, the power-off gear position is third gear, and with the gear selector in the "second" position, the power-off gear position is second gear. Reverse is provided when the gear selector is placed in the "reverse" position.

Figure 5:
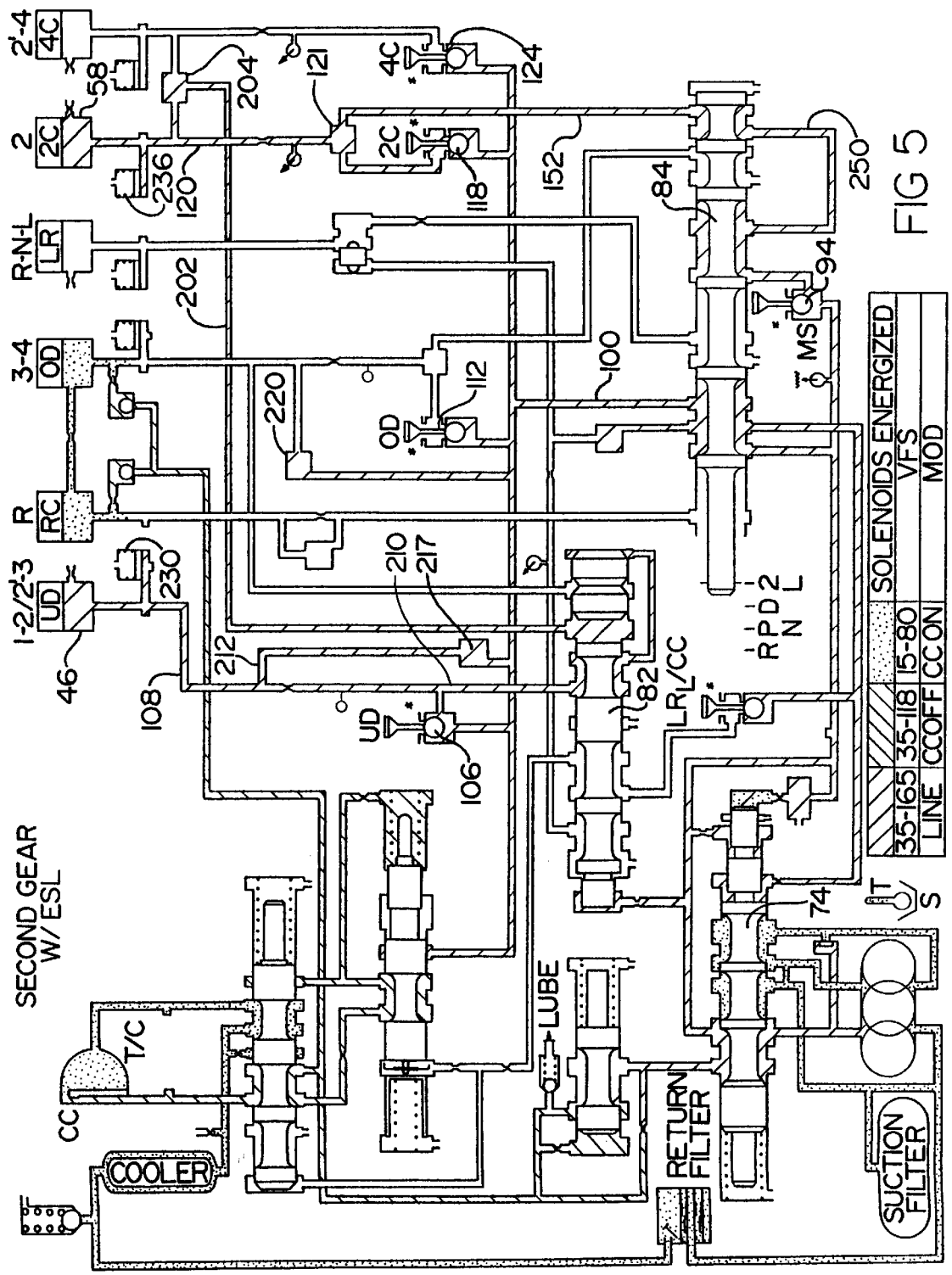
FIG. 5 is a schematic diagram of the hydraulic control system of the present invention illustrating the hydraulic control system in second gear with energy saving logic.

The unique manual valve and solenoid arrangement also permits an energy saving logic to be used. Since in some gear positions, the multi-select solenoid 94 is also connected to the friction element which is being applied, application of the friction element can be maintained by turning electrical power off to both of the solenoids thereby saving electrical power. During operation in third gear, before using energy saving logic the transmission will be in third gear with the multi-select solenoid 94 and overdrive solenoid 112 energized as shown in FIG. 8. After it has been determined that the transmission has been in third gear for a predetermined amount of time (for example two seconds), third gear can then be maintained with the multi-select solenoid 94 and the overdrive clutch solenoid 112 turned off, as shown in FIG. 9. Similarly, the transmission can be operated in second gear wherein the multi-select solenoid 94 and second gear clutch solenoid 118 are energized as in FIG. 4. However, second gear can also be maintained in energy saving logic mode with the multi-select solenoid valve 94 and second gear clutch solenoid valve 118 each being de-energized, as shown in FIG. 5. The transmission can similarly be operated in overdrive with the multi-select solenoid 94, underdrive clutch solenoid 106, overdrive clutch solenoid 112, and fourth gear clutch solenoid 124 each being energized. The overdrive gear can be maintained with energy saving logic by de-energizing the multi-select solenoid valve 94 and the overdrive clutch solenoid 112, as shown in FIG. 14.

The transmission of the present invention also has a unique arrangement of lubrication and cooler circuits. The lubrication and cooler circuits of the present invention are fed in parallel. One path which provides gear train lubrication flow, receives high priority to prevent lubrication starvation concerns under extremes of temperature and speed conditions. Another feature is that the pressurized lubrication circuit is demand dependant. As the demand increases due to centrifugal effects, the controlled pressure increases lube flow to meet component lubrication requirements. This is due to the regulated pressure supplied to the lubrication circuit via regulator valve 74. The other path is routed through the torque converter and cooler 178 and is directed back into the pump suction 188. By routing the fluid into the pump inlet, a portion of the fluid energy is saved by using fluid velocity to help fill the pump.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control system for an automatic transmission including a planetary gear system having at least one clutch element engagable to alter the torque ratio of the transmission, said hydraulic control system comprising:

a pressurized fluid source;

a manual valve selectively movable between a plurality of positions and communicating with said pressurized fluid source;

a first fluid passage communicated with the at least one clutch element and said manual valve, said first fluid passage including a normally closed solenoid valve;

a second fluid passage communicated with the at least one clutch element and said manual valve, said second fluid passage including a normally open solenoid valve;

said hydraulic control system being capable of engaging the at least one clutch element with said manual valve in a predetermined position and said normally closed solenoid valve in an energized, open state and said normally open solenoid valve in an energized, closed state, said hydraulic control system further being capable of engaging the at least one clutch element with said manual valve in said predetermined position and said normally closed and said normally open solenoid valves de-energized.

2. A hydraulic control system for an automatic transmission including a planetary gear system having first and second clutch elements separately engagable to alter the torque ratio of the transmission, said hydraulic control system comprising:

a pressurized fluid source;

a manual valve selectively movable between a plurality of positions and communicating with said pressurized fluid source;

a first fluid passage communicated with the first clutch element and said manual valve, said first fluid passage including a first normally closed solenoid valve;

a second fluid passage communicated with the first clutch element and said manual valve, said second fluid passage including a normally open solenoid valve;

said hydraulic control system being capable of engaging the first clutch element with said manual valve in a first predetermined position and said first normally closed solenoid valve in an energized, open state and said normally open solenoid valve in an energized, closed state, said hydraulic control system further being capable of engaging the first clutch element with said manual valve in said first predetermined position and said first normally closed solenoid valve and said normally open solenoid valve de-energized;

a third fluid passage communicated with the second clutch element and said manual valve, said second fluid passage including a second normally closed solenoid valve;

a fourth fluid passage communicated with the second clutch element and said manual valve, said fourth fluid passage including said normally open solenoid valve;

said hydraulic control system being capable of engaging the second clutch element with said manual valve in a second predetermined position and said second normally closed solenoid valve in an energized, open state and said normally open solenoid valve in an energized, closed state, said hydraulic control system further being capable of engaging the second clutch element with said manual valve in said second predetermined position and said second normally closed and said normally open solenoid valves de-energized.

3. A hydraulically controlled automatic transmission having energy savings logic, comprising:

a planetary gear system having at least one clutch element engagable to alter a torque ratio of the planetary gear system;

a pressurized fluid source;

a manual valve selectively movable between a plurality of positions and communicating with said pressurized fluid source;

a first fluid passage communicated with the at least one clutch element and said manual valve, said first fluid passage including a normally closed solenoid valve;

a second fluid passage communicated with the at least one clutch element and said manual valve, said second fluid passage including a normally open solenoid valve;

said hydraulic control system being capable of engaging the at least one clutch element with said manual valve in a predetermined position and said normally closed solenoid valve in an energized, open state and said normally open solenoid valve in an energized, closed state, said hydraulic control system further being capable of engaging the at least one clutch element with said manual valve in said predetermined position and said normally closed and said normally open solenoid valves de-energized; and a transmission controller for selectivley engaging an energy saving logic operation mode when said at least one clutch element is engaged with said first and second solenoids being energized so as to provide pressurized fluid to said first fluid passage and said manual valve is in said predetermined position such that said normally closed and said normally open solenoids are de-energized so that pressurized fluid is continued to be delivered to said at least one clutch element via said second fluid passage.

4. A method of controlling a hydraulic transmission including a planetary gear system having at least one clutch element engagable to alter a torque ratio of the planetary gear system, a pressurized fluid source, a manual valve selectively movable between a plurality of positions and communicating with said pressurized fluid source, a first fluid passage communicated with the at least one clutch element and said manual valve, said first fluid passage including a normally closed solenoid valve, a second fluid passage communicated with the at least one clutch element and said manual valve, said second fluid passage including a normally open solenoid valve, said hydraulic control system being capable of engaging the at least one clutch element with said manual valve in a predetermined position and said normally closed solenoid valve in an energized, open state and said normally open solenoid valve in an energized, closed state, said hydraulic control system further being capable of engaging the at least one clutch element with said manual valve in said predetermined position and said normally closed and said normally open solenoid valves de-energized, said method comprising the steps of:

determining if said manual valve is in said predetermined position and if said at least one clutch element is engaged with said normally closed solenoid valve and said normally open solenoid valve energized, and if so, selecting an energy savings mode wherein said normally closed solenoid valve and said normally open solenoid valve are de-energized in order to provide pressurized fluid to said at least one clutch element via said second fluid passage.

* * * * *